(12) United States Patent
Soman et al.

(10) Patent No.: US 9,652,307 B1
(45) Date of Patent: May 16, 2017

(54) EVENT SYSTEM FOR A DISTRIBUTED FABRIC

(71) Applicant: EMC Corporation, Hopkinton, MA (US)

(72) Inventors: Sunil V. Soman, Seattle, WA (US); Henning Rohde, Seattle, WA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/870,668

(22) Filed: Sep. 30, 2015

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .............. *G06F 9/542* (2013.01); *G06F 9/547* (2013.01)

(58) Field of Classification Search
CPC ........................................ G06F 9/542
USPC ......................................................... 719/318
See application file for complete search history.

(56) References Cited

U.S. PATENT DOCUMENTS

| | | | |
|---|---|---|---|
| 2002/0194347 A1* | 12/2002 | Koo | G06F 9/542 709/227 |
| 2006/0041593 A1* | 2/2006 | Borthakur | G06F 17/30067 |
| 2008/0092149 A1* | 4/2008 | Rowbotham | G06F 9/4443 719/321 |

* cited by examiner

*Primary Examiner* — Timothy A Mudrick
(74) *Attorney, Agent, or Firm* — Krishnendu Gupta; Joseph J. D'Angelo

(57) ABSTRACT

A computer implemented method, a computer program product, and a system for managing events in a distributed system comprising: creating events in a distributed system at an event system, wherein the event system includes an event library; tagging each of the events with an increasing sequence number and with one or more channels during creation of each event; and storing the events in an event segment of the event system, wherein the events are enabled to be retrieved in order based on the sequence number and a filter.

21 Claims, 10 Drawing Sheets

EVENT SYSTEM FOR A DISTRIBUTED FABRIC

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to an event system.

BACKGROUND

Conventionally, an increase in processing power of computer systems may have ushered in a new era in which information is accessed on a constant basis. Generally, one response may have been to distribute processing requests across multiple nodes or devices. Typically, a distributed architecture may allow for more flexible configurations with respect to factors such as speed, bandwidth management, and other performance and reliability parameters.

Generally, a distributed architecture may allow multiple nodes to process incoming requests. Typically, different process requests may be handled by different nodes. Generally, there is an ongoing need to improve a manner in which nodes of a distributed architecture processes events.

SUMMARY

A computer implemented method, a computer program product, and a system for managing events in a distributed system comprising: creating events in a distributed system at an event system, wherein the event system includes an event library; tagging each of the events with an increasing sequence number and with one or more channels during creation of each event; and storing the events in an event segment of the event system, wherein the events are enabled to be retrieved in order based on the sequence number and a filter.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
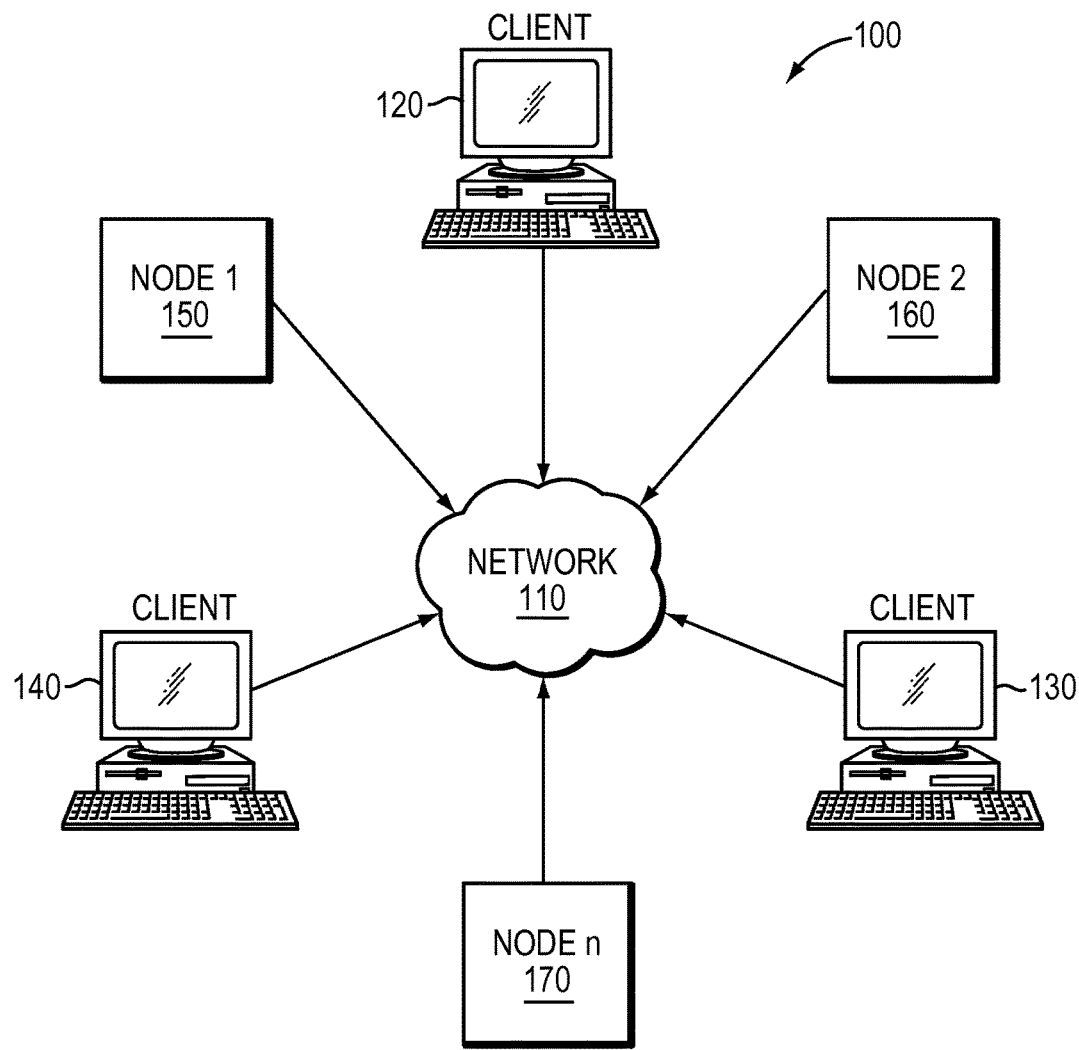
FIG. 1 is a simplified illustration of a block diagram of logical and physical connections in a distributed event system in accordance with an embodiment of the present disclosure.

Generally, distributed systems may encompass several nodes and processes interacting over remote network links. Typically, a critical part of building a distributed infrastructure may be reliably and efficiently communicating changes of state between components and for clients to monitor a state of an infrastructure.

Traditionally, there may be two general mechanisms for communicating changes of state between components: polling and (pushed) events. Typically, for polling, a client may periodically request a current state of a component that a client wishes to observe. Generally, polling may not result in responsive behavior. Conventionally, consistency of polling may be highly dependent on polling intervals, timeouts, and retries, and may be considered inadequate for responsive systems.

Generally, distributed systems that may be concerned about responsiveness and consistency may use (pushed) events. Conventionally, (pushed) events may be messages that are transmitted as push notifications. Typically, push-based event systems may fall into one or more of the following categories: (1) unreliable or best-effort systems, (2) event aggregation or batch delivery systems, (3) event systems that may allow for replay of events, and (4) event systems that may allow clients to use timestamps. Traditionally, unreliable or best-effort systems may encompass unordered events that may be pushed out to clients at a rate that may be generally controlled by a producer. Generally, events may be missed or lost event when observed locally, i.e., on a same node that they may be produced.

Conventionally, event aggregation or batch delivery systems may be systems that deliver events in bulk. Typically, event aggregation or batch delivery systems may aim to conserve network bandwidth. Generally, event aggregation or batch delivery systems may provide reliability by writing aggregated events to disk at a cost of increased latency.

Traditionally, event systems may allow for replay of events. Typically, event systems that may allow for replay of events may not have a mechanism to control for how long events may be retained. Generally, event systems that may allow for replay of events may not expand to fill a disk or may not have clearly defined semantics when disk space is low.

Conventionally, event systems may allow for clients to use timestamps to retrieve events. Traditionally, event system that may allow for clients to use timestamps may work locally, but may not work in a distributed system.

Traditionally, prior event systems may exhibit numerous problems. Generally, prior event systems may exhibit reliability problems, retention and replay problems, real-time delivery problems, progress problems, correlation problems, conflict resolution problems, and inefficient filtering problems. Typically, prior event systems may exhibit a reliability problem where an event system may not provide a way to reliably order and deliver events. Conventionally, events may become lost and a client may not have a method of determining that events may be lost. Typically, producers may have to transmit duplicates of lost events and a client may receive the same message multiple times. Generally, multiple concurrent clients may observe an order of events differently, which may make it extremely difficult to reason about state transitions for debugging purposes.

Conventionally, prior event systems may exhibit retention and replay problems where an event system may treat all events as transient. Generally, a producer may need to retransmit an entire state on a restart or retransmit an entire state periodically, or events may be recorded to disk (or key/value store) without regard to space availability.

Typically, prior events may exhibit real-time delivery problems where an event system may deliver messages periodically or batched based on a predetermined threshold. Generally, a client may not react to a change in state immediately and a system may lack responsiveness. Conventionally, a prior event system that may exhibit a real-time delivery problem may be exacerbated if events are sparse.

Traditionally, prior event systems may exhibit a progress problem where a batch delivery of events or an unreliable event mechanism may make it difficult for a listener/client to be aware that a service has acted on a change of information or on a specific action, i.e., if an action is asynchronous, multi-step, or long-lived. Conventionally, prior event systems that experience progress problems may have to use timeouts and perform complex recovery functions when timeouts expires, which may not entail an explicit or immediate notification of progress.

Generally, prior event systems may exhibit correlation problems. Traditionally, event systems may experience correlation problems due to a lack of real-time delivery where an observable change in a component's state may not be immediately reflected in a stream of events generated by an event system. Typically, querying a state of a component and a state as observed from an event system may be out of sync and inconsistent. Conventionally, without reliable correlation identification, race conditions may make it difficult—if not impossible—to observe an event system directly and reliably pick up incremental changes from events. Generally, timestamps may have been well-known to be inadequate in distributed systems. Typically, timestamps may result in significant problems in a distributed system.

Conventionally, prior event systems may exhibit conflict resolution problems. Typically, on rollover or data loss, a client may not unambiguously determine if a given stream of events has been seen before or if a given stream of events represents new information. Generally, an extreme case receiving events that may have been seen before may be a result of complete data loss, in which case a client state may have to be cleared. Traditionally, a few event systems may handle cases where central data, such as a global event identification counter, may be lost without manual intervention.

Conventionally, prior event systems may exhibit inefficient filtering. Typically, clients may primarily be concerned about a specific type or subset of events. Generally, event systems that may use complex queries to filter events may tax a CPU and may have to throttle requests (i.e., regulating a rate of processing events) to prevent an overloading or denial of service scenario.

In many embodiments, the current disclosure may enable a reliable event system that may provide (a) real-time delivery of events; (b) reliability of ordered stream of events through sequencing; (c) space-bounded retention and replay of events; and (d) robustness in a scenario of disk failures and loss of events.

In most embodiments, an event system may be structured as an event library with an ability to have configurable back ends (i.e., a local disk, a cluster-level key/value store, a combination of shared memory and local disk, etc.). In some embodiments, an event library may be able to mitigate prior event system problems, such as reliability problems, retention and replay problems, real-time delivery problems, progress problems, correlation problems, conflict resolution problems, and inefficient filtering problems. In certain embodiments, an event library may be able to mitigate prior event system problems by combining efficient encoding, real-time delivery of events, and reliability of ordered stream of events through sequencing, bounded retention, and performance using techniques like shared memory. In most embodiments, a distributed fabric with an event library as a core component may be built. In many embodiments, a distributed fabric with an event library may allow clients to observe quickly behavior and state changes in order to monitor and communicate effectively at a node and cluster level.

In most embodiments, an event library may have an interface that encompasses two API calls: emit event and listen. In some embodiments, an emit event may be used by a producer to create a new event. In certain embodiments, events may get a unique and monotonic sequence number. In most events, a monotonic sequence number may entail a function between ordered sets of values that may preserve a given order of increasing values. In several embodiments, a last sequence number of an event stream may be available as part of a REST API response that may allow correlation between an event stream and information available through an API. In many embodiments, tagging of events may occur under a lock as a transaction. In some embodiments, lock as a transaction may encompass a system of protecting a transaction from changing a unique sequence of tagged events.

In most embodiments, an API call may be a listen API call. In some embodiments, a customer or client may utilize a listen API call, locally or remotely, to receive a stream of events starting at a specific sequence number.

In several embodiments, events may be stored in a bounded buffer, such as an event segment. In other embodiments, events may be encoded in a compact manner to save space on a disk or on a network. In many embodiments, reliability in delivery of streams of events may be achieved by tagging an event with a unique and sequential number that may reflect an order in which an event may have been generated. In certain embodiments, an event may be fully created and populated when an event is assigned a sequence number.

In most embodiments, clients or customers may be able to replay events starting at a particular sequence number. In some embodiments, replaying events starting at a particular sequence number may guarantee that events will be delivered to clients or customers in the same order in which events may have been generated by a producer/component.

In certain embodiments, a producer may be able to perform de-duplication and may not have to transmit the same event multiple times to the same client or customer.

In most embodiments, distributed systems may be difficult to debug since a client or customer may query various components for current state information. In many embodiments, administrators may have to look at copious amounts of logs to reason about state changes. In most embodiments, the ability to observe a stream of events in real-time may permit clients to piece together a sequence of events to inform a client or customer of a current state of any component.

In some embodiments, an event may be tagged with a channel. In certain embodiments, a channel may be represented by a power of two. In several embodiments, clients may be able to register interest in one or more channels by providing a bitmask representing one or more channels that interest a client or customer. In several embodiments, a channel may refer to specific events, such as to a disk, to a firewall, to a compute node, or to security. In most embodiments, filtering may be performed efficiently on a server side by masking events in which a client may have an interest. In many embodiments, execution of expensive queries on a server side may not need to be performed in an effort to mitigate inefficient filtering that may have been exhibited in prior event systems.

In some embodiments, an event segment may have a unique identifier. In most embodiments, a client or customer may be able to query an identifier for a current event segment to which may have received writes. In certain embodiments, in a scenario where stored event segments may become missing or lost, sequence numbers may be reused. In other embodiments, where sequence numbers may be reused, a client may use a segment identifier to ensure that a client is reading from a correct event segment. In many embodiments, utilizing an event segment identifier may solve a conflict resolution problem that may have been exhibited in prior event systems.

In most embodiments, events may be written to shared memory to safeguard against process restarts or to make writes extremely fast. In certain embodiments, an event segment is persisted to a disk when it is full of events. In several embodiments, an event segment is persisted to a disk on process termination. In other embodiments, a size of an event segment may be tuned and there may be a tradeoff between resiliency and performance. In some embodiments, there may be an option of writing events synchronously to disk. In several embodiments, events may be efficiently encoded as protocol buffer messages and consume very little disk and network bandwidth. In many embodiments, events may be stored in the same format as events are transmitted. In most embodiments, as a result of transmitting events in their same format, there may not be a need to perform transformations or encoding when reading/writing events either to a disk or a to a network. In certain embodiments, a "sendfile" system call to transfer an event segment may be utilized, which may be efficient, performant, and may allow for a low memory footprint.

In many embodiments, event retention to disk may be bounded by size. In some embodiments, a disk bounded by size may continue to function when disk space is low. In other embodiments, a time interval may be use to decide when to roll over for audit logs.

In certain embodiments, events may be pushed out to clients immediately. In some embodiments, events being pushed out immediately may mean that events are pushed out to clients as soon as events are generated. In several embodiments, real-time delivery of events may mean that events are transmitted in a sub-millisecond timeframe. In other embodiments, events may be compact and event remote clients may receive events in real-time delivery. In many embodiments, clients may use a "long poll" mechanism to connect to an event system with a long timeout interval. In most embodiments, an event stream may be configured as "transient." In certain embodiments, "transient" may mean that events may be delivered from memory due to rapidly changing information that may not be warranted for retention purposes. In other embodiments, "transient" may relate to events where recent historical data may need to be necessary for access, such as operating system counters, service thread count, or memory use.

In some embodiments, if a client's access to events fails, a client may resume from a last sequence number the client received where it may have been guaranteed that events may have been delivered in sequence.

In many embodiments, a server failure may represent an extreme case with regard to data loss or corruption/reversal to a valid initial state (re-installation of software). In most embodiments, event segments may have a unique identifier, such as a UUID. In some embodiments, when all persisted data may be lost, sequence numbers may be reused. In certain embodiments, in order to resolve conflicts, clients may compare an event segment identifier that may have been expected to be accessed to an event segment that was reported by a server. In many embodiments, an ability to verify an identifier to an event segment permits a client to determine whether or not a client has seen a particular event in a past or a client is receiving new information. In certain embodiments, producers and servers may re-emit their state on a system restart. In other embodiments, clients may be able to read an event stream starting at a sequence number that may correspond to a system start or restart, which may be queried using a simple REST call.

In most embodiments, real-time delivery and sequencing of events may aid in immediate observability of state changes as well as in assisting clients to understand ordering of events. In certain embodiments, sequence numbers that may correspond to events that a server may generate as a result of an API call may be made available as part of a response. In some embodiments, correlating sequence numbers with an event stream observed through an API call may permit an understanding that an action was processed.

In certain embodiments, a sequence number of 30 may be returned as a result of a PUT action on a resource. In many embodiments, by looking at an event stream where a sequence number of 30 may have been a result of a PUT action, may inform a client that an event with a sequence number greater than 30 may have occurred after a PUT call was accepted. In most embodiments, events reporting state of a resource corresponding to numbers less than 30 may have unequivocally occurred before a PUT call was accepted. In most embodiments, if an event with a sequence number greater than 30 may have been observed that relates to a change in state of the same resource, then the resource may have been modified after a client performed a PUT operation on the resource. In certain embodiments, a client may know that the client may have received stale information about the resource. In other embodiments, knowledge that stale information about a resource was received may prevent a client from having to poll or wait for an unknown period of time to know whether or not a state of a resource has changed.

In some embodiments, a client acting on events may include a sequence number (etag) in an action request to guard against event delays or race conditions. In many embodiments, clients may not have a need for a direct read to obtain an etag and possibly having to deal with state reconciliation.

In many embodiments, an event library may be included in a fabric. In some embodiments, a fabric may be distributed infrastructure software on an operating system host. In most embodiments, a fabric may provide API and semantics to deploy and manage applications, such as object storage software. In certain embodiments, nodes may run natively on a fabric. In other embodiments, fabric components may run as containers, such as lifecycle instances, registry, and persistence.

In some embodiments, a fabric may be responsible for installing services. In many embodiments, a fabric may be responsible for managing services, such as contract and resource services. In other embodiments, a contract service may include a life cycle service. In certain embodiments, resource services may include disk, containers, firewall, and network. In most embodiments, a fabric may be responsible for controlled upgrades to a system. In other embodiments, a fabric may be responsible for system health, failure detection, and alerting a system. In some embodiments, a fabric may be responsible for tracking and reacting to environmental changes. In many embodiments, a fabric may be responsible for allowing an operator to manage a system.

In certain embodiments, lifecycle service may include nodes aggregated into clusters. In some embodiments, lifecycle service may include being responsible for deployment, failure detection, and recovery, notification, and migration of data. In most embodiments, lifecycle service may include establishing and managing trust between nodes, such as credentials, certificate of authority, and certification distribution. In many embodiments, lifecycle service may include managing application lifecycle, such as installation, upgrades, and shutdown of a system.

In certain embodiments, a node agent may be an interface to an event library. In some embodiments, a node agent may manage host resources, such as containers, disks, firewall applications, and network applications. In other embodiments, a node agent may monitor system processes. In most embodiments, a node agent may be controlled by a command line interface, which provides an ability to interact with other nodes with trust. In many embodiments, a node agent may be a representational state transfer application program interface (REST API). In some embodiments, a node agent may be a passive component, i.e., may not need power to operate. In other embodiments, a node agent may provide a stream of events.

In certain embodiments, a cluster management layer may include multiple instances of lifecycle services. In many embodiments, a lifecycle service instance may manage a subset of nodes. In most embodiments, if one or more lifecycle service instances become offline, another lifecycle service instance may take over responsibility of a subset of nodes belonging to an offline lifecycle instance.

In some embodiments, components may push events on state changes. In other embodiments, pushed events on state changes may be events within an event stream that may be ordered. In several embodiments, pushed events on state changes may be in real-time and persisted (replayable).

In most embodiments, an event library may have replay ability through sequence numbers corresponding to events. In many embodiments, an event library may have multiple back ends, such as being able to write to shared memory, disk, and cluster level storage. In other embodiments, an event library may be able to generate events on state changes and provide de-duplication and server side filtering. In certain embodiments, an event library may be encoded as small protocol buffer messages. In other embodiments, an event library may permit a client to perform long poll where events are pushed as events are generated. In many embodiments, an event library may provide retention policies, such short term and retention requirements for auditing. In some embodiments, an event library may provide a listen API call that includes an event stream, bitmask (channel), and a sequence number starting position.

In most embodiments, filtering may be performed on a server side of a system. In many embodiments, a server may use a bitmask encoded into an event for comparison to other events.

Reference is now made to FIG. 1, which is a simplified illustration of a block diagram of logical and physical connections in a distributed event system in accordance with an embodiment of the present disclosure. Shown in FIG. 1 is distributed event system 100. Distributed event system 100 includes Network 110, Client 120, Client 130, Client 140, Node 1 150, Node 2 160, and Node n 170.

Figure 2:
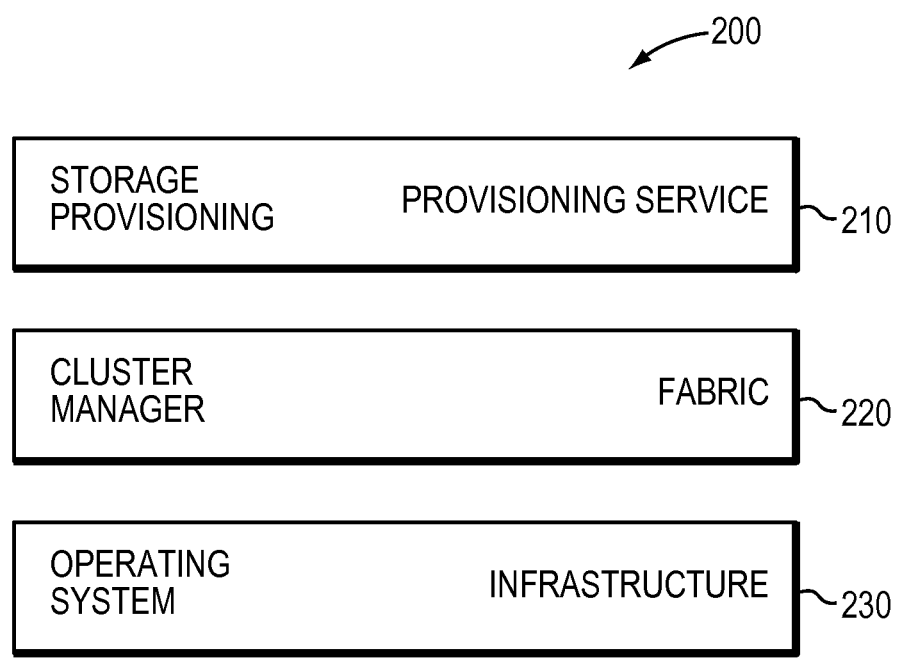
FIG. 2 is a simplified illustration of a block diagram of a storage platform with software layers and services in accordance with an embodiment of the present disclosure.

Reference is now made to FIG. 2, which is a simplified illustration of a block diagram of a storage platform with software layers and services in accordance with an embodiment of the present disclosure. Shown in FIG. 2 is software-defined cloud storage platform 200. Software-defined cloud storage platform 200 includes provisioning service layer 210, fabric software layer 220, and infrastructure layer 230.

Figure 3:
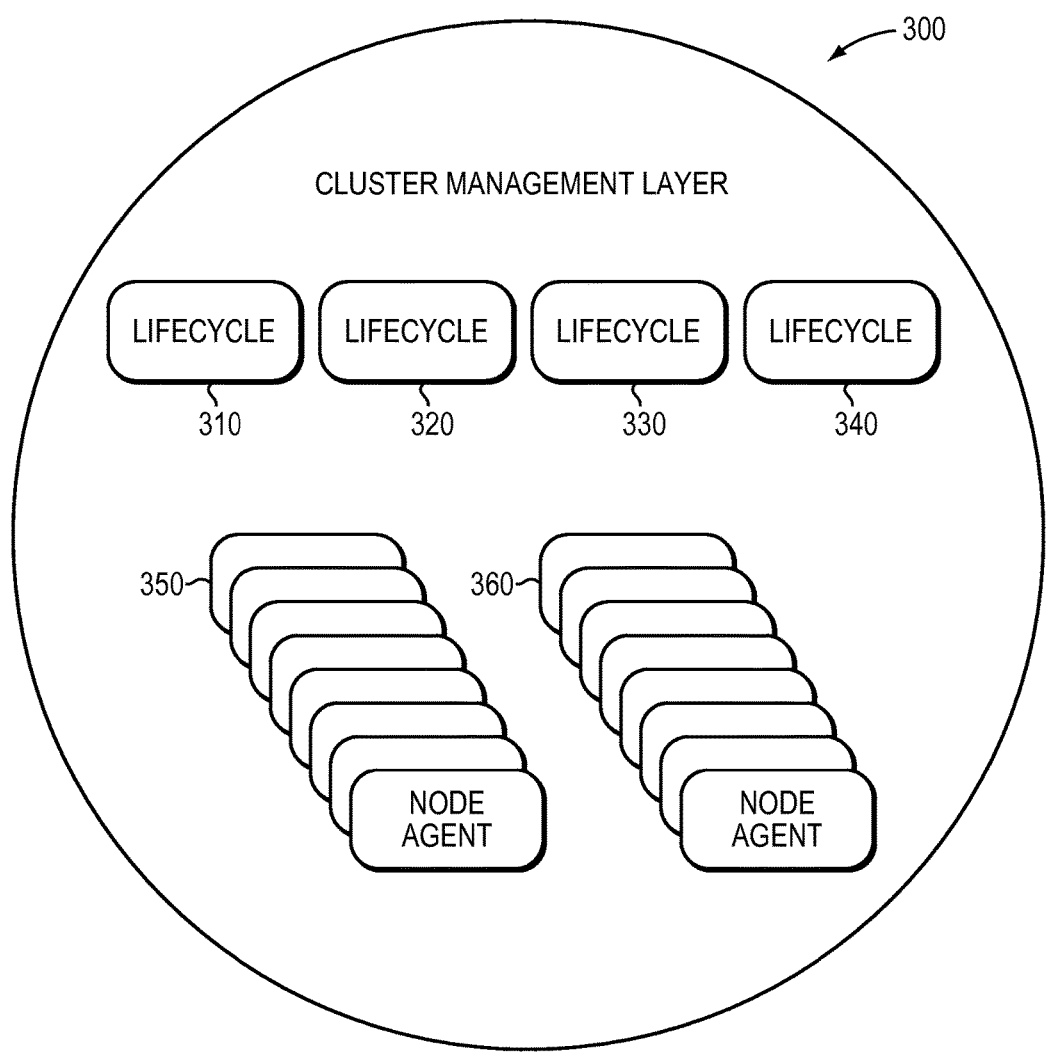
FIG. 3 is a simplified illustration of a block diagram of a cluster manager layer in a distributed event system in accordance with an embodiment of the present disclosure.

Refer now to the example embodiment of FIG. 3, which is a simplified illustration of a block diagram of a cluster manager layer in a distributed event system in accordance with an embodiment of the present disclosure. FIG. 3 illustrates cluster management layer 300. Cluster management layer 300 includes lifecycle 310, lifecycle 320, lifecycle 330, and lifecycle 340. Cluster management layer 300 also includes cluster of node agents 350 and cluster of node agents 360.

Figure 4:
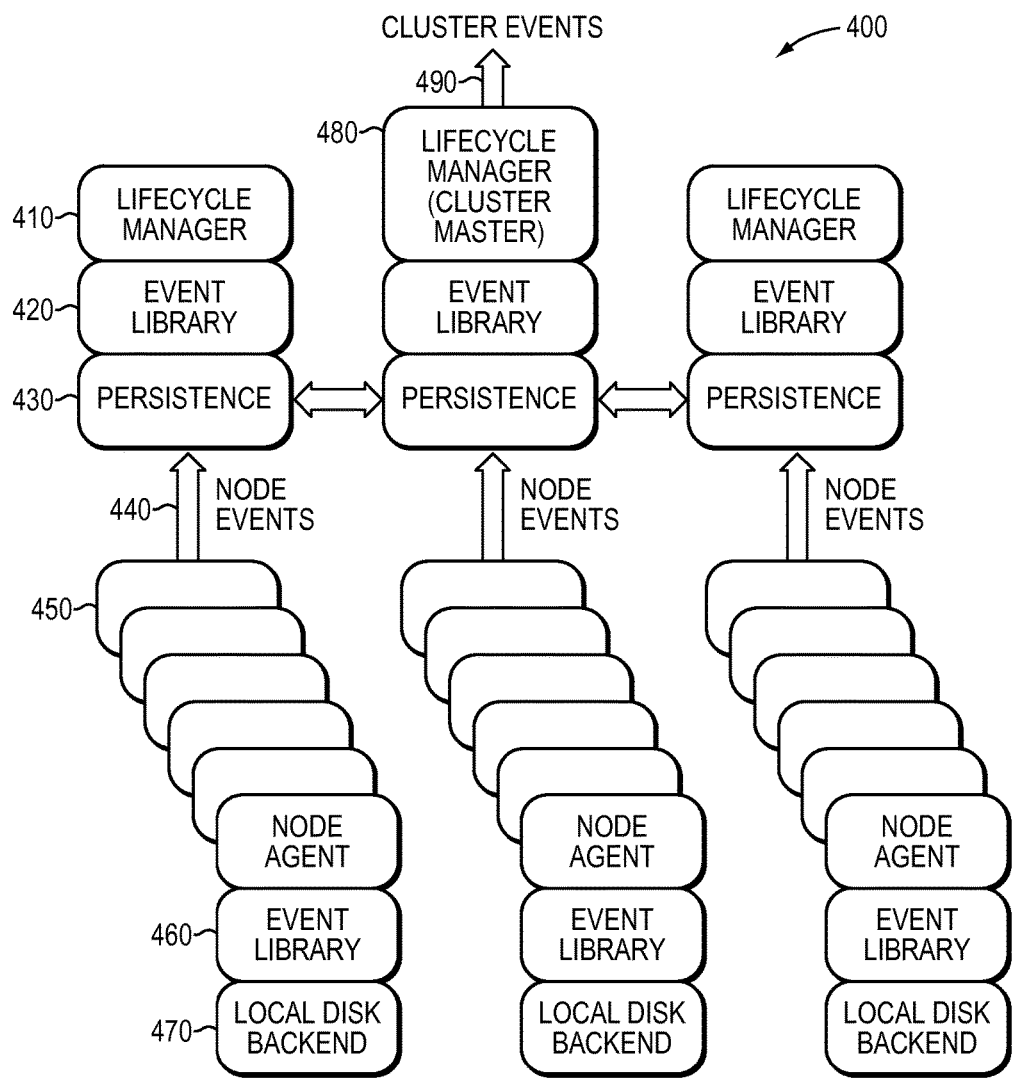
FIG. 4 is a simplified illustration of a flowchart of components pushing events in a distributed event system in accordance with an embodiment of the present disclosure.

Refer now to the example embodiment of FIG. 4, which is a simplified illustration of a flowchart of components pushing events in a distributed event system in accordance with an embodiment of the present disclosure. In FIG. 4, flowchart of components 400 includes lifecycle manager 410, event library 420, and cluster level persistence 430. Flowchart of components 400 also includes node events 440, cluster of node agents 450, event library 460, and local disk back end 470. Flowchart of components 400 also includes lifecycle manager (cluster master) 480 and cluster events 490.

Figure 5:
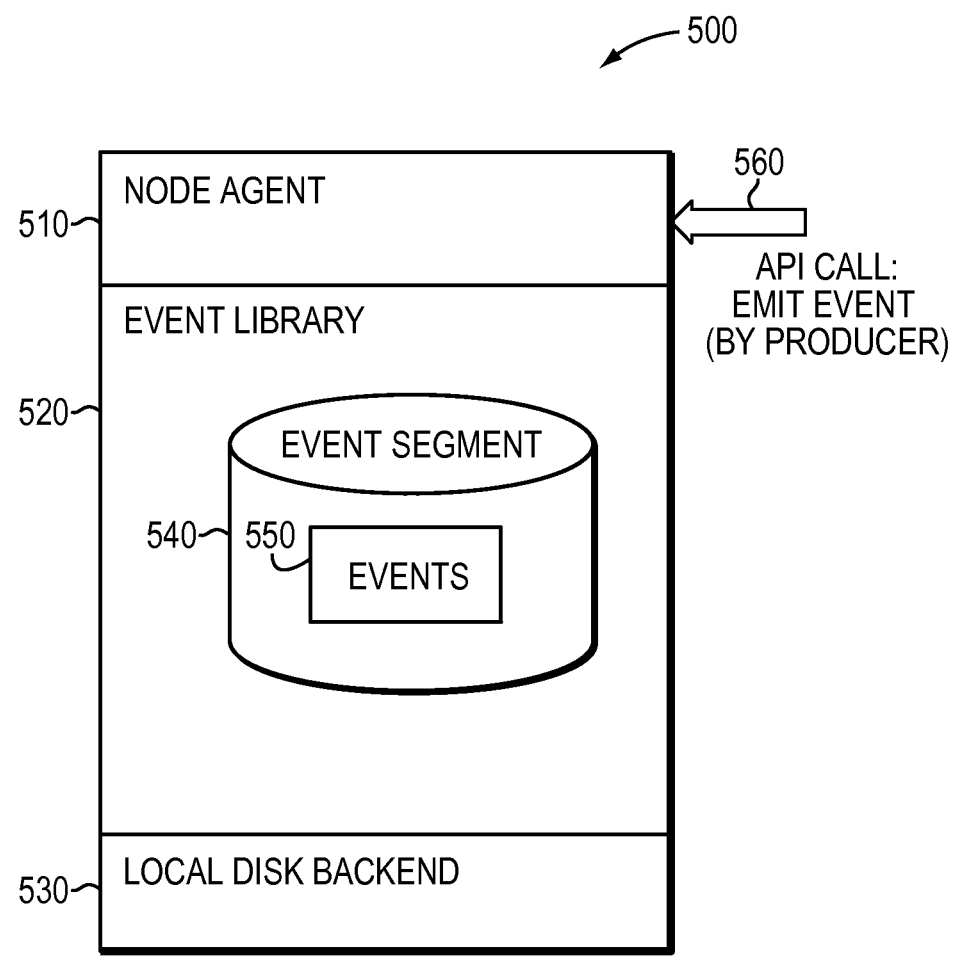
FIG. 5 is a simplified illustration of a block diagram of a system for creating events in an event system in accordance with an embodiment of the present disclosure.

Refer now to the example embodiment of FIG. 5, which is a simplified illustration of a block diagram of a system for creating events in an event system in accordance with an embodiment of the present disclosure. In FIG. 5, system 500 includes node agent 510, event library 520, and local disk back end 530. System 500 includes API call: emit event 560. Event library 520 includes event segment 540. Event segment 540 includes events 550.

Figure 6:
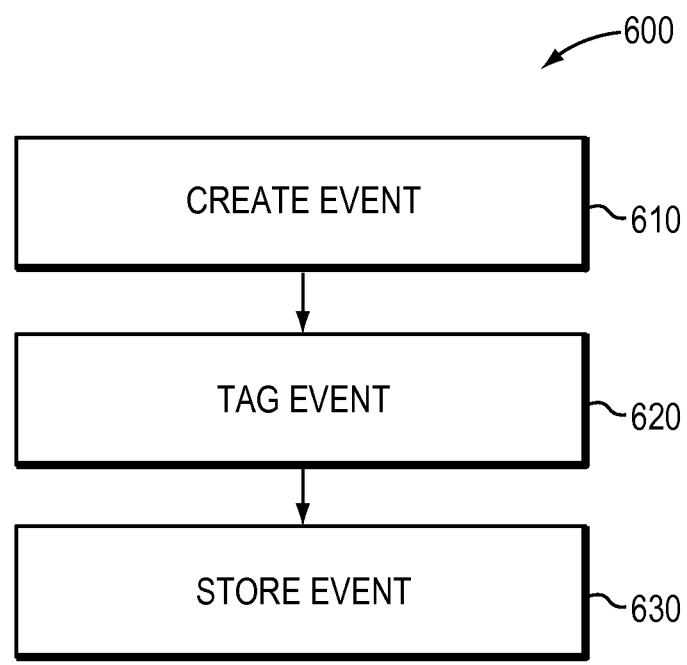
FIG. 6 is a simplified illustration of a block diagram of a method for entering events in an event system in accordance with an embodiment of the present disclosure.

Refer now to the example embodiments of FIG. 5 and FIG. 6. FIG. 6 is a simplified illustration of a block diagram of a method for creating events in an event system in accordance with an embodiment of the present disclosure. In FIG. 6, emit event API call 560 to node agent 510 creates events (step 610). During creation of events, events are tagged (step 620). Events 550 are stored in event segment 540 (step 630).

Figure 7:
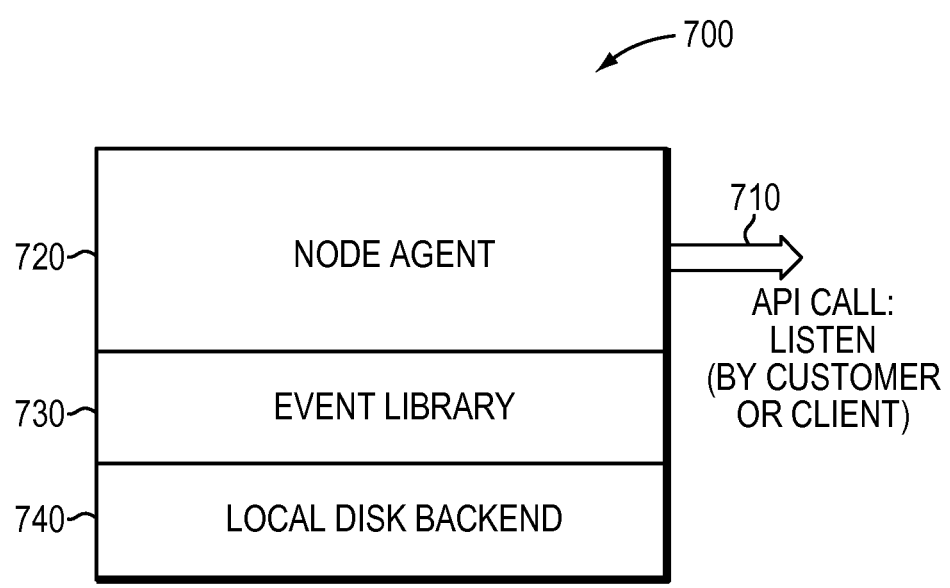
FIG. 7 is a simplified illustration of a block diagram of a system for accessing events in an event system in accordance with an embodiment of the present disclosure.

Refer now to the example embodiment of FIG. 7, which is a simplified illustration of a block diagram of a system for accessing events in an event system in accordance with an embodiment of the present disclosure. In FIG. 7, system 700 includes API call: listen 710. System 700 includes node agent 720, event library 730, and local disk back end 740.

Figure 8:
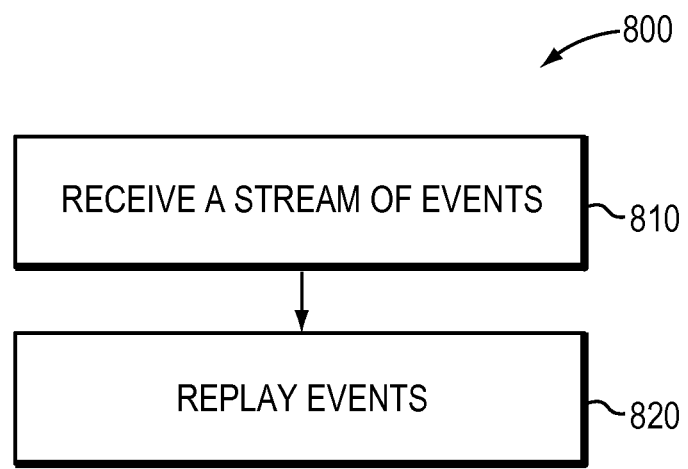
FIG. 8 is a simplified illustration of a block diagram of a method for accessing events in an event system in accordance with an embodiment of the present disclosure.

Refer now to the example embodiments of FIG. 7 and FIG. 8. FIG. 8 is a simplified illustration of a block diagram of a method for accessing events in an event system in accordance with an embodiment of the present disclosure. In FIG. 8, listen API call 710 to node agent 720 receives a stream of events (step 810). Customer or clients replays events (step 820).

Figure 9:
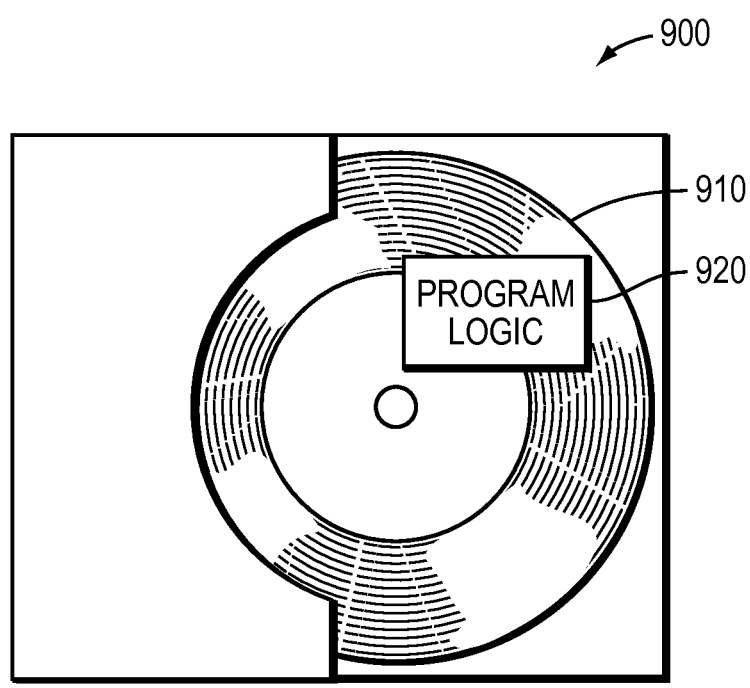
FIG. 9 is a diagram illustrating an example embodiment method of the present disclosure embodied as program code or a program product.

Refer now to the example embodiment of FIG. 9. FIG. 9 shows Program Logic 920 embodied on a computer-readable medium 910 as shown, and wherein the Program Logic 920 is encoded in computer-executable code configured for carrying out the measurement and analysis process of this invention and thereby forming a Computer Program Product 900.

The logic for carrying out the method may be embodied as part of the aforementioned system, which is useful for carrying out a method described with reference to embodiments shown in, for example, FIG. 6 and FIG. 8. For purposes of illustrating the present invention, the invention is described as embodied in a specific configuration and using special logical arrangements, but one skilled in the art will appreciate that the device is not limited to the specific configuration but rather only by the claims included with this specification.

Figure 10:
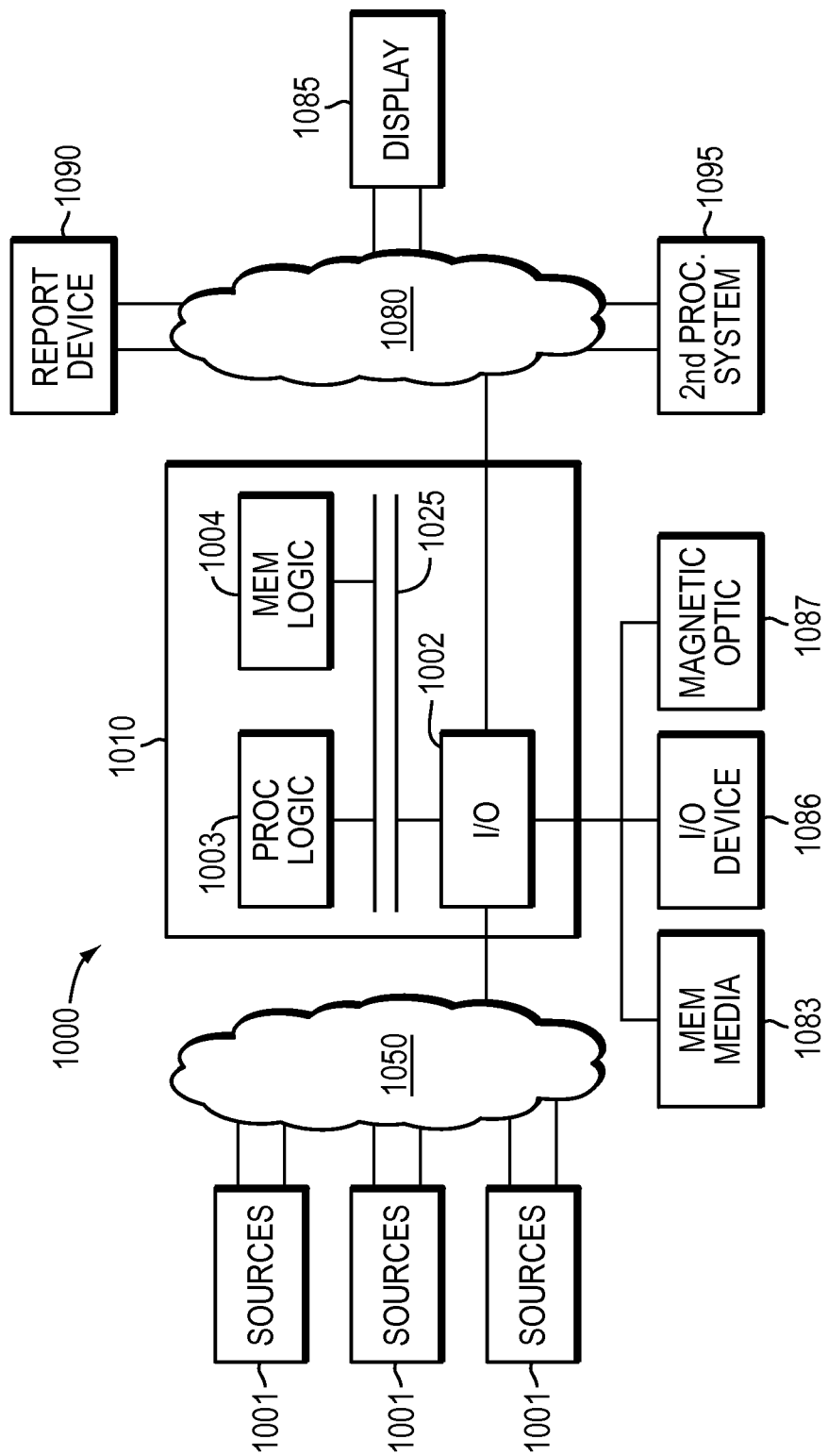
FIG. 10 is an example of an embodiment of an apparatus that may utilize the techniques described herein in accordance with an embodiment of the present disclosure.

Refer now to the example embodiment of FIG. 10. The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. A processor may be a physical processor or one or a virtual processor. In certain embodiments, a virtual processor may correspond to one or more or parts of one or more physical processors.

The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer implemented method for managing events in a distributed fabric, the distributed fabric including distributed infrastructure software on an operating system host, the method comprising:

creating events at node agents in the distributed fabric including a plurality of nodes in an event system, wherein the event system includes an event library; wherein each of the node agents is an interface to the event library; wherein each node agent of the node agents is enabled to manage resources of an associated node of the plurality of nodes; wherein each of the node agent of the node agents is enabled to send events created at each respective node agent to a persistence layer of the distributed fabric; wherein the persistence layer is connected to the event library;

tagging each of the events at the time of creation of the event with unique increasing sequence number under a lock transaction and tagging the each of the events with one or more channels; wherein the lock transaction ensures a unique sequence of tagging of the events; where the unique increasing sequence number indicates the order of the event relative to other events in the event library; and storing the events in an event segment of the event system, wherein the events are enabled to be retrieved in order based on the unique sequence number and a filter.

2. The method of claim 1, wherein an interface to the event library comprises API calls, wherein the API calls comprise an emit event API call and a listen API call, wherein the listen API enables receipt of a stream of events starting at a specific unique sequence number, and wherein the emit event is used by a node agent of the node agents to create a new event; wherein the events are pushed out as soon as each event is generated.

3. The method of claim 2, wherein events tagged with the one or more channels enables filtering of events, wherein a user is enabled to register interest in the one or more channels by providing a bit mask representing the one or more channels that the user has an interest, wherein bit mask filtering is performed on a server side of the event system by masking events.

4. The method of claim 1, wherein events in event segments are retained based on retention requirements selected from the group consisting of disk space and level of reliability.

5. The method of claim 1, wherein the event system comprises at least one event segment, wherein the event segment is persisted to one or more backend storages, wherein persistence to the one or more backend storages results as a response selected from the group consisting of when the event segment is full of events and when process termination occurs.

6. The method of claim 5, wherein the one or more backend storages is selected from the group consisting of a local disk, a combination of shared memory and local disk, and a distributed key/value store.

7. The method of claim 1, wherein sequence numbers enables a client to recognize a status of events selected from the group consisting of new events or past events, wherein a last sequence number of events enables correlation between an event stream and information available through an API.

8. A computer program product for managing events in a distributed fabric, the distributed fabric including distributed infrastructure software on an operating system host, the computer program product comprising:
- a non-transitory computer-readable storage medium encoded with computer-executable program code enabling:
- creating events at node agents in the distributed fabric including a plurality of nodes in an event system, wherein the event system includes an event library; wherein each of the node agents is an interface to the event library; wherein each node agent of the node agents is enabled to manage resources of an associated node of the plurality of nodes; wherein each of the node agent of the node agents is enabled to send events created at each respective node agent to a persistence layer of the distributed fabric; wherein the persistence layer is connected to the event library;
- tagging each of the events at the time of creation of the event with unique increasing sequence number under a lock transaction and tagging the each of the events with one or more channels; wherein the lock transaction ensures a unique sequence of tagging of the events; where the unique increasing sequence number indicates the order of the event relative to other events in the event library; and
- storing the events in an event segment of the event system, wherein the events are enabled to be retrieved in order based on the unique sequence number and a filter.

9. The computer program product of claim 8, wherein an interface to the event library comprises API calls, wherein the API calls comprise an emit event API call and a listen API call, wherein the listen enables receipt of a stream of events starting at a specific unique sequence number, and wherein the emit event is used by a node agent of the node agents to create a new event; wherein the events are pushed out as soon as each event is generated.

10. The computer program product of claim 9, wherein events tagged with the one or more channels enables filtering of events, wherein a user is enabled to register interest in the one or more channels by providing a bit mask representing the one or more channels that the user has an interest, wherein bit mask filtering is performed on a server side of the event system by masking events.

11. The computer program product of claim 8, wherein events are stored in event segments, wherein events are retained based on retention requirements selected from the group consisting of disk space and level of reliability.

12. The computer program product of claim 8, wherein the event system comprises at least one event segment, wherein the event segment is persisted to one or more backend storages, wherein persistence to the one or more backend storages results as a response selected from the group consisting of when the event segment is full of events and when process termination occurs.

13. The computer program product of claim 12, wherein the one or more backend storages is selected from the group consisting of a local disk, a combination of shared memory and local disk, and a distributed key/value store.

14. The computer program product of claim 9, wherein sequence numbers enables a client to recognize a status of events selected from the group consisting of new events or past events, wherein a last sequence number of events enables correlation between an event stream and information available through an API.

15. A system for managing events in a distributed fabric, the distributed fabric including distributed infrastructure software on an operating system host, the system comprising:
- one or more processors;
- computer-executable program code operating in the memory across the one or more processor, wherein the computer-executable program code is configured to enable execution across the one or more processors of:
- creating events at node agents in the distributed fabric including a plurality of nodes in an event system, wherein the event system includes an event library; wherein each of the node agents is an interface to the event library; wherein each node agent of the node agents is enabled to manage resources of an associated node of the plurality of nodes; wherein each of the node agent of the node agents is enabled to send events created at each respective node agent to a persistence layer of the distributed fabric; wherein the persistence layer is connected to the event library;
- tagging each of the events at the time of creation of the event with unique increasing sequence number under a lock transaction and tagging the each of the events with one or more channels; wherein the lock transaction ensures a unique sequence of tagging of the events; where the unique increasing sequence number indicates the order of the event relative to other events in the event library; and
- storing the events in an event segment of the event system, wherein the events are enabled to be retrieved in order based on the unique sequence number and a filter.

16. The system of claim 15, wherein an interface to the event library comprises API calls, wherein the API calls comprise an emit event API call and a listen API call, wherein the listen API enables receipt of a stream of events starting at a specific unique sequence number, and wherein the emit event is used by a node agent of the node agents to create a new event; wherein the events are pushed out as soon as each event is generated.

17. The system of claim 16, wherein events tagged with the one or more channels enables filtering of events, wherein a user is enabled to register interest in the one or more channels by providing a bit mask representing the one or more channels that the user has an interest, wherein bit mask filtering is performed on a server side of the event system by masking events.

18. The system of claim 15, wherein events are stored in event segments, wherein events are retained based on retention requirements selected from the group consisting of disk space and level of reliability.

19. The system of claim 15, wherein the event system comprises at least one event segment, wherein the event segment is persisted to one or more backend storages, wherein persistence to the one or more backend storages results as a response selected from the group consisting of when the event segment is full of events and when process termination occurs.

20. The system of claim 19, wherein the one or more backend storages is selected from the group consisting of a local disk, a combination of shared memory and local disk, and a distributed key/value store.

21. The system of claim 15, wherein sequence numbers enables a client to recognize a status of events selected from the group consisting of new events or past events, wherein a last sequence number of events enables correlation between an event stream and information available through an API.

* * * * *